(12) United States Patent
Mbaye

(10) Patent No.: US 7,130,203 B2
(45) Date of Patent: Oct. 31, 2006

(54) SWITCHING POWER SUPPLY WITH A SNUBBER CIRCUIT

(75) Inventor: Fall Mbaye, Schliern (CH)

(73) Assignee: DET International Holding Limited, Grand Cayman (KY)

( * ) Notice: Subject to any disclaimer, the term of this patent is extended or adjusted under 35 U.S.C. 154(b) by 0 days.

(21) Appl. No.: 10/513,130

(22) PCT Filed: Apr. 30, 2002

(86) PCT No.: PCT/CH02/00236

§ 371 (c)(1),
(2), (4) Date: Jun. 29, 2005

(87) PCT Pub. No.: WO03/094332

PCT Pub. Date: Nov. 13, 2003

(65) Prior Publication Data

US 2005/0259451 A1    Nov. 24, 2005

(51) Int. Cl.
*H02M 3/337* (2006.01)

(52) U.S. Cl. .................. 363/56.12; 363/56.06

(58) Field of Classification Search .......... 363/16, 363/55, 56.01, 56.06, 56.12, 131, 132, 133
See application file for complete search history.

(56) References Cited

U.S. PATENT DOCUMENTS

| | | | |
|---|---|---|---|
| 5,278,748 A | | 1/1994 | Kitajima |
| 5,351,179 A | * | 9/1994 | Tsai et al. ............ 363/53 |
| 5,508,903 A | | 4/1996 | Alexndrov |
| 5,673,186 A | | 9/1997 | Johnson |
| 5,898,581 A | * | 4/1999 | Liu .................... 363/53 |
| 5,923,547 A | | 7/1999 | Mao |
| 5,946,200 A | | 8/1999 | Kim et al. |
| 6,115,273 A | * | 9/2000 | Geissler ............... 363/89 |
| 6,333,861 B1 | * | 12/2001 | Goodman ............. 363/20 |
| 6,532,160 B1 | * | 3/2003 | Hirokawa et al. ...... 363/52 |

FOREIGN PATENT DOCUMENTS

WO    WO 94/23488    10/1994

OTHER PUBLICATIONS

Eun-Soo Kim et al, "An Improved ZVZCS PWM FB DC/DC Converter Using Energy Recovery Snubber", IEEE, Feb. 1997, pp. 1014-1019.

* cited by examiner

*Primary Examiner*—Adolf Berhane
(74) *Attorney, Agent, or Firm*—Gallagher & Kennedy, P.A; Thomas D. MacBlain

(57) ABSTRACT

A DC/DC power supply with two transformers (10, 20), which for example are connected in parallel on the primary and in series on the secondary side, comprises two passive, non-dissipative snubber circuits (1.1, 1.2). Each snubber circuit comprises a series circuit formed by a capacitor (3.1, 3.2) and a diode (4.4, 4.7), which is connected to the output capacitor (13) of the power supply. The transformers are interleaved with a push-pull configuration. On the secondary side, the power supply has an output choke (12, 22) and two output rectifiers (11, 21) are connected to the secondary winding (14, 24) of each transformer. Each snubber circuit further comprises two additional diodes (4.5, 4.6, 4.8, 4.9), one electrode of these diodes being connected to the joint electrode of the snubber capacitor (3.1, 3.2) and the first snubber diode (4.4, 4.7) and the other electrodes being connected respectively to an end of the secondary winding (14, 24) of a transformer.

10 Claims, 1 Drawing Sheet

SWITCHING POWER SUPPLY WITH A SNUBBER CIRCUIT

TECHNICAL FIELD

Figure 1:
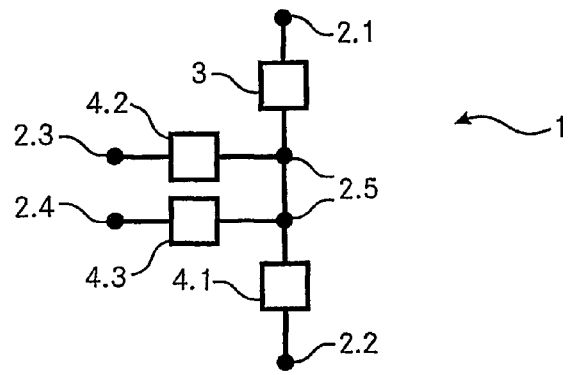

The invention relates to a switching power supply providing a DC output, the power supply having an output capacitor, a transformer with a primary and a secondary winding and a snubber circuit comprising a snubber capacitor and a first snubber diode. The invention further relates to a snubber circuit for such a switching power supply.

PRIOR ART

The number of electrically powered devices has increased enormously over the last decades. Accordingly, the demand for power supplies along with the requirements which they have to meet, has also increased. A low failure rate and high efficiency are among the most important requirements for power supplies.

A widely used type of power supplies are the switching power supplies which typically are smaller, lighter and generate less heat than an equivalent linear power supply. To lower switching losses, to reduce the rate of current or voltage rise or to limit overvoltages so called snubber circuits were introduced.

Since a snubber circuit typically comprises resistors, capacitors, diodes and/or inductors, they generate losses and produce heat which has to be dissipated. Generally spoken, they lower the overall efficiency of the power supply.

SUMMARY OF THE INVENTION

It is an object of the invention to provide a switching power supply of the kind mentioned at the beginning, particularly to provide a switching power supply with a lossless or a low-loss snubber circuit.

The object of the invention is achieved by the switching power supply defined in claim 1. According to the invention, the switching. power supply provides a DC output and comprises an output capacitor, a transformer with a primary and a secondary winding and a snubber circuit with a diode and a capacitor. The snubber diode and the snubber capacitor are connected in series, having a joint electrode. In other words, one electrode of the snubber diode, either the anode or the cathode, is connected directly to an electrode of the snubber capacitor. According to the invention, the snubber diode and the snubber capacitor form a series circuit which is connected in parallel to the output capacitor.

Therefore, the snubber circuit is purely passive and since it is connected to the output capacitor of the power supply, it is non-dissipative too, because the energy which is stored in the snubber capacitor during a first period of time is recycled, i. e. transferred, to the output capacitor during a second period of time.

As this energy can be used to drive a load being connected to the power supply, it does not have to be dissipated. Therefore, lower currents and/or voltages within the power supply are necessary in order to reach the same power level as in a known power supply. This in turn enables the usage of electrical and/or magnetic components with a lower nominal power, which typically have lower losses, resulting in a power supply with a higher efficiency and a lower EMI (electromagnetic interference). Moreover, since the load on most of the components of the power supply is reduced, a smaller failure rate can be achieved.

Generally, a snubber circuit can comprise other components such as for example inductors and resistors. The snubber circuit for the inventive power supply preferably does not comprise any inductors or resistors, but additionally to the above mentioned first snubber diode a second and a third snubber diode. Both of these diodes are connected to the joint electrode of the first snubber diode and the snubber capacitor with one of their electrodes, i. e. either the anode or the cathode. Preferably, the same electrode of both diodes is connected to the joint electrode. The other electrodes of these diodes are connected to the ends of the secondary winding, i. e. the second electrode of the second snubber diode is connected to a first end of the secondary winding of the power supply transformer and the second electrode of the third snubber diode accordingly is connected to the other, the second end of the secondary winding of the transformer.

One advantage of this snubber circuit is, that it limits the overvoltage across the output rectifier diodes, which for example are arranged as a full bridge rectifier connected to the secondary winding. That is why it is possible to make use of diodes for lower voltages. As low voltage diodes typically have a smaller voltage drop and a shorter reverse recovery time than high voltage diodes, their usage typically results in a higher efficiency and in a lower EMI.

The snubber circuit described is well suited for usage in a DC/DC converter. However, as every DC/DC power supply easily can be converted to an AC/DC power supply by adding an input rectifier-and connecting an AC power source, this snubber circuit can also be used with an AC/DC power supply.

Although it is possible to use different power supply configurations such as flyback, forward or other converters, the power supply in a favoured implementation of the invention is a push-pull converter because such converters have a low output ripple current and, due to the high switching frequencies, the size of the transformer can be small. The push-pull converter comprises at least two power switches, which are alternately driven as known in the art. MOSFETs (metal oxide semiconductor field effect transistor) can for example be used to switch the input power. Nevertheless, other electronic switches can be used as well.

In another favoured implementation of the invention the power supply comprises two transformers. The primary windings of the transformers are connected in parallel while the secondary windings are connected in series. In this embodiment of the invention, the power supply comprises two snubber circuits as well, where the snubber circuits are connected to the secondary windings of the transformers respectively.

By using two transformers in parallel on the primary side, the RMS (root mean square) current in the input capacitor of the power supply, which typically is an electrolytic capacitor, can be reduced. Furthermore, as a result of this design, the frequency on the secondary side of the power supply is multiplied by four. This enables to reduce the size of the output choke for high power applications, resulting in a smaller and lower-cost power supply.

In this embodiment of the invention, a rectifier, for example a full bridge rectifier, is connected to the secondary winding of each transformer. Hence, each snubber circuit limits the overvoltage across the rectifier diodes of the rectifier which is connected to the same transformer as the snubber circuit itself.

In the power supply embodiment with two transformers, the snubber circuits are very similar to each other and are connected to the secondary windings of the transformers in a similar way. Both of them comprise a snubber capacitor as well as a first, a second and a third snubber diode. The two snubber circuits only differ in the polarisation of some of their components. The two snubber circuits are connected to the output capacitor and the secondary windings of the power supply as follows:

The anode of the first snubber diode of the first snubber circuit is connected to the first electrode of the output capacitor.

The cathode of the first snubber diode of the first snubber circuit is connected to the first electrode of the snubber capacitor of the first snubber circuit and the second electrode of the snubber capacitor of the first snubber circuit is connected to the second electrode of the output capacitor.

The anode of the second snubber diode of the first snubber circuit is connected to the cathode of the first snubber diode of the first snubber circuit and the cathode of the second snubber diode of the first snubber circuit is connected to the first end of the secondary winding of the first transformer.

The anode of the third snubber diode of the first snubber circuit is connected to the cathode of the first snubber diode of the first snubber circuit and the cathode of the third snubber diode of the first snubber circuit is connected to the second end of the secondary winding of the first transformer.

The cathode of the first snubber diode of the second snubber circuit is connected to the second electrode of the output capacitor.

The anode of the first snubber diode of the second snubber circuit is connected to the first electrode of the snubber capacitor of the second snubber circuit and the second electrode of the snubber capacitor of the second snubber circuit is connected to the first electrode of the output capacitor.

The cathode of the second snubber diode of the second snubber circuit is connected to the anode of the first snubber diode of the second snubber circuit and the anode of the second snubber diode of the second snubber circuit is connected to the first end of the secondary winding of the second transformer.

The cathode of the third snubber diode of the second snubber circuit is connected to the anode of the first snubber diode of the second snubber circuit and the anode of the third snubber diode of the second snubber circuit is connected to the second end of the secondary winding of the second transformer.

In a further preferred embodiment of the invention, where the power supply comprises two transformers, both transformers are in a push-pull configuration. Hence, the primary winding of each transformer comprises two interleaved segments, where each segment is connected in series with a power switch. In order to alternately switch the segments of a transformer, the two branches of a particular transformer, which are formed by a segment and the corresponding switch, are connected in parallel.

Typically, an output filter is placed at the output of a power supply in order to smoothen the output voltage. The above mentioned output capacitor is a part of such an output filter, which further typically comprises an inductor connected in series with the output capacitor either ahead of or following it. Such inductors or chokes can for example be implemented by a winding, which is looped around a magnetic core.

In a preferred embodiment of the invention, the inductor of the output filter is split into two inductors, one of them being positioned ahead of the output capacitor and one following it. When using the above mentioned electrode terms for the snubber components, this means that the first inductor is positioned between the second electrode of the snubber capacitor of the first snubber circuit and the second electrode of the output capacitor. The second inductor is positioned between the second electrode of the snubber capacitor of the second snubber circuit and the first electrode of the output capacitor.

In order to simplify the implementation of the power supply and to reduce the costs, the two output inductors can be realised by looping the windings of both inductors around the same magnetic core.

From the following detailed description and from the entirety of the claims it will be clear to a person skilled in the art, that there are more advantageous embodiments and feature combinations of the invention.

SHORT DESCRIPTION OF THE DRAWINGS

Figure 2:
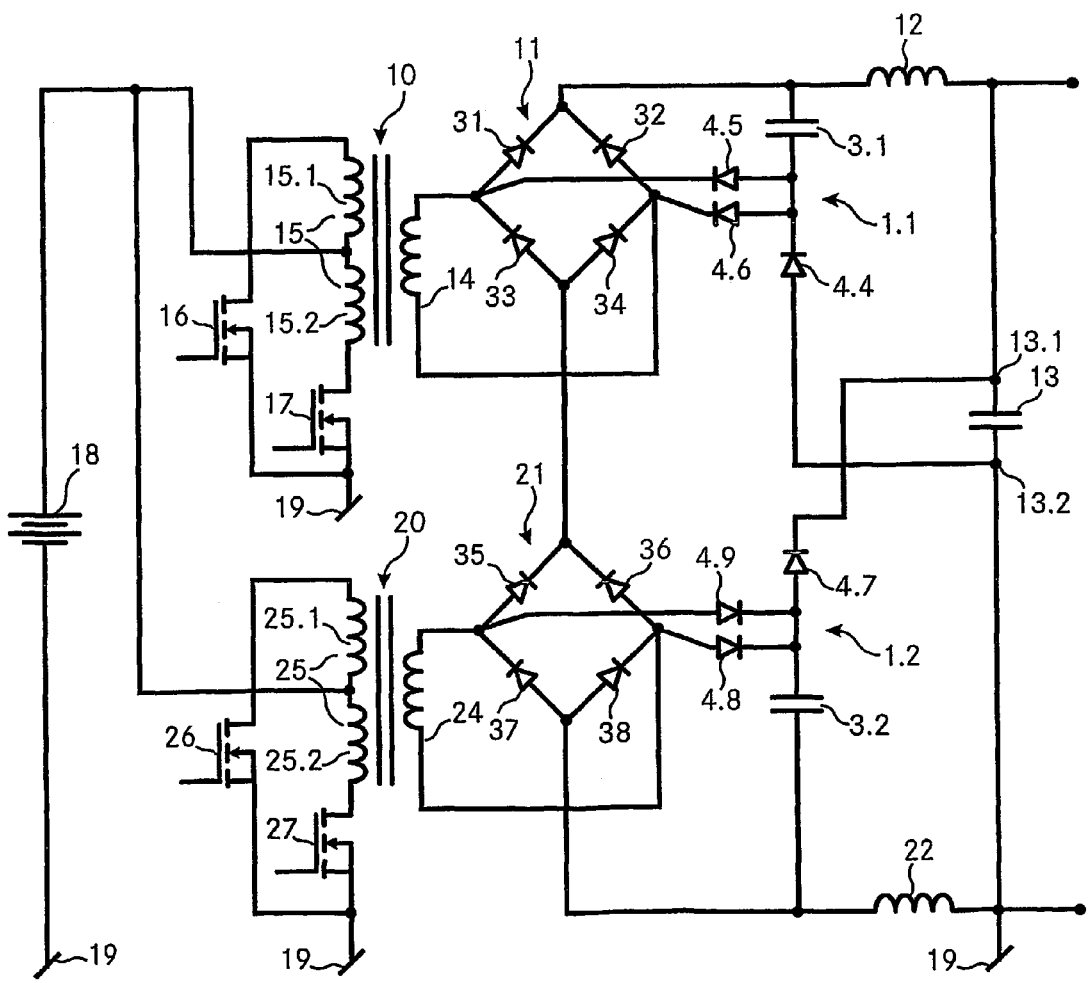

The drawings used for illustration of the examples show:
FIG. 1 illustrates a snubber circuit according to the invention in block diagram form, and
FIG. 2 is a power supply schematic diagram with showing a snubber circuit according to the invention.
In general, the same objects in different drawings are given the same reference numerals.

WAYS OF CARRYING OUT THE INVENTION

FIG. 1 shows a snubber circuit 1 according to the invention. The snubber circuit 1 comprises several terminals 2.1, 2.2, 2.3, 2.4, 2.5 which are used for connecting the snubber circuit 1 to a power supply and for connecting the components of the snubber circuit 1 itself. The snubber circuit comprises a capacitor 3 and three diodes 4.1, 4.2, 4.3 whereby capacitor 3 and diode 4.1 are connected in series via terminal 2.5. The other diodes 4.2, 4.3 are also connected to terminal 2.5 with one of their electrodes.

FIG. 2 shows a power supply according to the invention, which comprises two snubber circuits 1.1, 1.2 as shown in FIG. 1. The power supply converts a DC input voltage from a voltage source 18 to a DC output voltage which is provided across the terminals 13.1, 13.2 of an output capacitor 13. A load (not shown) can be connected across the output capacitor 13.

The DC/DC converter comprises two transformers 10 and 20, each having a primary winding 15, 25 and a secondary winding 14, 24. The primary windings 15, 25 are connected in parallel across the terminals of the voltage source 18. The negative terminal of the voltage source is connected to ground 19.

The primary windings 15, 25 of the transformers 10, 20 are interleaved and have two winding segments 15.1, 15.2 and 25.1, 25.2 respectively, whereby the winding segments of a particular transformer are connected in parallel. So the winding segments 15.1, 15.2 of transformer 10 are connected in parallel to ground 19 and the winding segments 25.1, 25.2 of transformer 20 are connected in parallel to ground 19.

To switch the input voltage, each winding segment 15.1, 15.2, 25.1, 25.2 is connected in series with a power switch 16, 17, 26, 27, which for example are implemented by MOSFETs. The switching of the power switches is controlled by a controller (not shown) as known in the art.

On the secondary side of the transformers 10, 20, two rectifiers 11, 21 are connected across the terminals of the secondary windings 14, 24. In the example as shown in FIG.

2, two diode full bridges are connected across the terminals of the secondary windings 14, 24. Each rectifier 11, 21 comprises four diodes 31, 32, 33, 34 and 35, 36, 37, 38 which are arranged in a known manner so as to form a full bridge rectifier.

The diode full bridges themselves are connected such that the secondary windings 14, 24 of the transformers 10, 20 are connected in series. Particularly, the anodes of the diodes 33, 34 of rectifier 11 are connected with each other as well as with the cathodes of the diodes 35 and 36 of rectifier 21.

The cathodes of the diodes 31, 32 of rectifier 11 are connected with each other as well as to a first electrode of an output choke 12, the second electrode of which is connected to a first electrode of the output capacitor 13. Correspondingly, the anodes of the diodes 37, 38 of rectifier 21 are connected with each other as well as to a first electrode of an output choke 22, the second electrode of which is connected to the second electrode of the output capacitor 13. The second electrode of the output capacitor 13 is connected to ground 19.

As mentioned above, the DC/DC converter comprises two snubber circuits 1.1, 1.2 each being connected to the secondary winding 14, 24 of a transformer 10, 20. According to FIG. 1, the capacitor 3.1 and the first diode 4.4 of snubber circuit 1.1 are connected in series such that the anode of diode 4.4 is connected to the second electrode of the output capacitor 13, the cathode of diode 4.4 is connected to a first electrode of capacitor 3.1 and the second electrode of capacitor 3.1 is connected to the first electrode of the output choke 12. The anodes of the second and third diodes 4.5, 4.6 of snubber circuit 1.1 are connected to the joint electrode of diode 4.4 and capacitor 3.1 respectively, while their cathodes are connected to the first and the second end of the secondary winding 14 of transformer 10.

Regarding snubber circuit 1.2, the capacitor 3.2 and its first diode 4.7 are connected in series such that the cathode of diode 4.7 is connected to the first electrode of the output capacitor 13, its anode being connected to a first electrode of capacitor 3.2 and the second electrode of capacitor 3.2 being connected to the first electrode of the output choke 22. The cathodes of the second and third diodes 4.8, 4.9 of snubber circuit 1.2 are connected to the joint electrode of diode 4.7 and capacitor 3.2 respectively, while their anodes are connected to the first and the second end of the secondary winding 24 of transformer 20.

The output chokes 12 and 22 are simply implemented by reducing them to one coupled choke.

While the rectifiers 11, 21 are described as full bridge rectifiers, it is generally also possible to use other rectifier configurations such as for example a half bridge rectifier.

Furthermore, the usage of the invention is not restricted to the push-pull converter topology shown in the drawings, it can also be applied to other topologies such as for example flyback, forward or other converters. If a push-pull configuration is used, other power switches than MOSFETs such as for example thyristors, GTO (gate turn-off) thyristors or IGBTs (insulated gate bipolar transistor) may be appropriate.

By adding an input rectifier, the invention can of course also be applied to AC/DC power supplies of any type.

To summarise it can be stated that the invention enables the implementation of a lossless snubber circuit, which can be utilised in a wide field of DC power supplies to reduce the failure rate as well as to improve the overall efficiency.

Although preferred embodiments of the invention have been described in detail, it will be readily appreciated by those skilled in the art that further modifications, alterations and additions to the invention embodiments disclosed may be made without departure from the spirit and scope of the invention as set forth in the appended claims.

The invention claimed is:

1. A switching power supply providing a DC output, the power supply having an output capacitor, a transformer with a primary and a secondary winding and a first snubber circuit comprising a snubber capacitor and a first snubber diode, characterized in that the snubber capacitor and the first snubber diode are arranged in a series circuit which is connected in parallel to the output capacitor, wherein the snubber circuit further comprises a second and a third snubber diode, a first electrode of the second snubber diode and a first electrode of the third snubber diode being connected to a joint electrode of the first snubber diode and the snubber capacitor, a second electrode of the second snubber diode being connected to a first end of the secondary winding and a second electrode of the third snubber diode being connected to a second end of the secondary winding.

2. The switching power supply according to claim 1, wherein the power supply has, in operation, a DC input voltage and a DC output voltage.

3. The switching power supply according to claim 1, further comprising at least two alternately driven power switches connected to the primary winding.

4. The switching power supply according to claim 2, further comprising at least two alternately driven power switches connected to the primary winding.

5. The switching power supply according to claim 4, further comprising a second snubber circuit and a second transformer having a primary and a secondary winding, the primary windings of the transformers being connected in parallel, the secondary windings of the transformers being connected in series and the first snubber circuit being connected to the secondary winding of the first transformer and the second snubber circuit being connected to the secondary winding of the second transformer.

6. The switching power supply according to claim 5, wherein both snubber circuits comprise a snubber capacitor and a first, a second and a third snubber diode, an anode of the first snubber diode of the first snubber circuit being connected to a first electrode of the output capacitor, a cathode of the first snubber diode of the first snubber circuit being connected to a first electrode of the snubber capacitor of the first snubber circuit and a second electrode of the snubber capacitor of the first snubber circuit being connected to a second electrode of the output capacitor, an anode of the second snubber diode of the first snubber circuit being connected to the cathode of the first snubber diode of the first snubber circuit and a cathode of the second snubber diode of the first snubber circuit being connected to a first end of the secondary winding of a first transformer, an anode of the third snubber diode of the first snubber circuit being connected to the cathode of the first snubber diode of the first snubber circuit and a cathode of the third snubber diode of the first snubber circuit being connected to a second end of the secondary winding of the first transformer, a cathode of the first snubber diode of the second snubber circuit being connected to the second electrode of the output capacitor, an anode of the first snubber diode of the second snubber circuit being connected to a first electrode of the snubber capacitor of the second snubber circuit and a second electrode of the snubber capacitor of the second snubber circuit being connected to the first electrode of the output capacitor, a cathode of the second snubber diode of the second snubber circuit being connected to the anode of the first snubber diode of the second snubber circuit and an anode of the second snubber diode of the second snubber circuit being connected to a first end of the secondary winding of a second transformer, a cathode of the third snubber diode of the second snubber circuit being connected to the anode of the first snubber diode of the second snubber circuit and an anode of the third snubber diode of the second snubber circuit being connected to a second end of the secondary winding of the second transformer.

7. The switching power supply according to claim 5, wherein the primary winding of each transformer comprises two interleaved, parallel connected segments, each segment being connected in series with a power switch.

8. The switching power supply according to claim 7, wherein the second electrode of the snubber capacitor of the first snubber circuit is connected to the second electrode of the output capacitor via a first inductor and the second electrode of the snubber capacitor of the second snubber circuit is connected to the first electrode of the output capacitor via a second inductor.

9. In a snubber circuit having a snubber capacitor and at least one snubber diode for a switching power supply having an output capacitor and providing a DC output; the improvement comprising the snubber diode and the snubber capacitor being connected in series, in operation the snubber circuit transferring energy stored in the snubber capacitor to the output capacitor of the switching power supply, further comprising a second and a third snubber diode, a first electrode of the second snubber diode and a first electrode of the third snubber diode being connected to a joint electrode of the first snubber diode and the snubber capacitor, a second electrode of the second snubber diode being connectable to a first end of a secondary winding of the power supply, and a second electrode of the third snubber diode being connectable to a second end of the secondary winding of the power supply.

10. The switching power supply according to claim 8, wherein the first and second inductors have a common core.

* * * * *